US008793013B2

(12) United States Patent
Kleine

(10) Patent No.: US 8,793,013 B2
(45) Date of Patent: Jul. 29, 2014

(54) METHOD FOR HANDLING LOADS IN A WAREHOUSE FOR CONTAINERS, PARTICULARLY STANDARD CONTAINERS

(75) Inventor: Ronald Kleine, Wetter (DE)

(73) Assignee: Gottwald Port Technology GmbH, Düsseldorf (DE)

( * ) Notice: Subject to any disclaimer, the term of this patent is extended or adjusted under 35 U.S.C. 154(b) by 535 days.

(21) Appl. No.: 13/132,118

(22) PCT Filed: Nov. 19, 2009

(86) PCT No.: PCT/EP2009/065455
§ 371 (c)(1),
(2), (4) Date: Jun. 1, 2011

(87) PCT Pub. No.: WO2010/063585
PCT Pub. Date: Jun. 10, 2010

(65) Prior Publication Data
US 2011/0238208 A1 Sep. 29, 2011

(30) Foreign Application Priority Data
Dec. 1, 2008 (DE) ........................ 10 2008 059 830

(51) Int. Cl.
*B65G 1/00* (2006.01)
*B66F 9/08* (2006.01)
*B66C 19/00* (2006.01)
*B66C 13/48* (2006.01)

(52) U.S. Cl.
CPC ................ *B66F 9/08* (2013.01); *B66C 19/002* (2013.01); *B66C 13/48* (2013.01)
USPC ........ 700/218; 700/213; 700/214; 414/137.1; 414/139.9; 414/140.3

(58) Field of Classification Search
USPC ........................................................ 700/218
See application file for complete search history.

(56) References Cited

U.S. PATENT DOCUMENTS 5,951,226 A * 9/1999 Fantuzzi .................... 414/141.3
6,551,043 B2 * 4/2003 Franzen et al. ............ 414/140.3
(Continued)

FOREIGN PATENT DOCUMENTS

DE 4413917 A1 10/1995
DE 102006044187 A1 4/2008
(Continued)

OTHER PUBLICATIONS

International Preliminary Examination Report (IPER) for International Application No. PCT/EP2009/065455, which corresponds to the current application.

(Continued)

*Primary Examiner* — Gene Crawford
*Assistant Examiner* — Kyle Logan
(74) *Attorney, Agent, or Firm* — Gardner, Linn, Burkhart & Flory, LLP

(57) ABSTRACT

A method is provided for handling loads in a warehouse for containers that may be automatically stored and removed from storage by a container stacking crane, between a storage area and a truck or other vehicle parked in a parking space of a loading and unloading area To optimize the throughput performance and safety of handling loads in a warehouse for containers, it is proposed that after the truck drives into the parking space and after the driver of the truck leaves the parking space, the parking space is secured against the presence of persons including the driver, before a release signal is given to the container stacking crane for the automatic loading or unloading process.

17 Claims, 4 Drawing Sheets

(56) References Cited

U.S. PATENT DOCUMENTS

| | | | | |
|---|---|---|---|---|
| 7,415,320 | B2 | 8/2008 | Moutsokapas | |
| 2005/0192702 | A1* | 9/2005 | Moutsokapas | 700/213 |
| 2006/0251498 | A1* | 11/2006 | Buzzoni et al. | 414/139.9 |
| 2008/0208389 | A1* | 8/2008 | Checketts | 700/214 |
| 2010/0021272 | A1* | 1/2010 | Ward et al. | 414/137.1 |

FOREIGN PATENT DOCUMENTS

| | | | |
|---|---|---|---|
| EP | 1219563 | A2 | 7/2002 |
| EP | 1490286 | A1 | 12/2004 |
| JP | 2002370806 | | 12/2002 |
| KR | 10-0658649 | | 11/2004 |

OTHER PUBLICATIONS

Substitute Specification, drawings, and Preliminary Amendment from co-pending U.S. Appl. No. 13/133,532, filed Jun. 8, 2011.

Substitute Specification, drawings, and Preliminary Amendment from co-pending U.S. Appl. No. 13/133,459, filed Jun. 8, 2011.

Substitute Specification, drawings, and Preliminary Amendment from co-pending U.S. Appl. No. 13/133,616, filed Jun. 8, 2011.

Japanese examination report in corresponding application JP 2011-523431, dated Mar. 19, 2013.

Korean examination report in corresponding application KR 10 2010-7029278.

German Examination Report on DE 102008059830 dated Jun. 30, 2009, which corresponds to the current application.

International Search Report and Written Opinion of the International Searching Authority from corresponding PCT Application No. PCT/EP2009/065455, mailed Mar. 22, 2010.

English translation of the International Search Report of the International Searching Authority from corresponding PCT Application No. PCT/EP2009/065455, dated Mar. 22, 2010.

* cited by examiner

METHOD FOR HANDLING LOADS IN A WAREHOUSE FOR CONTAINERS, PARTICULARLY STANDARD CONTAINERS

BACKGROUND OF THE INVENTION

The invention relates to a method for handling loads in a warehouse for containers, particularly standard containers.

European patent application EP 1 490 286 B1 discloses a method for handling loads of standard containers in a warehouse. The warehouse is a part of a port cargo handling installation which includes a water-side handling area, the warehouse and a land-side handling area. The water-side handling area has handling devices in the form of handling bridges with which ships lying alongside a quay are loaded and/or unloaded. Between the handling devices and an area of the warehouse where containers are placed into and removed from storage, the containers are transported by floor-borne vehicles, in particular driverless transport vehicles. At the end opposite the area where containers are placed into and removed from storage, the warehouse is allocated a loading and unloading area for transport vehicles such as trucks or lorries, to which the transport vehicles travel via an entry and exit area of the handling installation with an identification area.

The warehouse is an automated warehouse with a corresponding automated area specially secured against unauthorised access by a boundary such as, for example, a wall or fence. The automated area of the warehouse terminates in each case at the adjacent land-side loading and unloading area for the lorries and at the adjacent water-side area where containers are placed into and removed from storage. In both these areas manual operation or semi-automatic operation takes place for safety reasons. The automated warehouse includes a rectangular, longitudinally extending warehouse area in which the containers are stored in columns and rows and stacked up to 5 containers one on top of another on the ground.

The warehouse area is located below an automatic stacking crane which can travel on rails. The automatic stacking crane includes a crane bridge, the ends of which run on elevated rails via running gears. The crane bridge is therefore able to travel in the longitudinal direction of the warehouse area. A trolley which can travel transverse to the warehouse area is disposed on the crane bridge. A vertically moveable mast is mounted on the trolley, the lower end of which mast is adjoined by a load-receiving means in the form of a spreader for containers. Gantry cranes or semi-gantry cranes can also be used instead of a stacking crane.

A handling process in this handling installation takes place as follows. A lorry to be loaded and/or unloaded travels into the handling installation via an entry and exit area and thus arrives in an identification area in which the lorry and possibly its transported containers are identified and measured. Access authorisation is then issued to the driver in the form of a magnetic card or chip card which contains all relevant data relating to the handling task. These data are also transmitted to a superordinate data processing system of a logistics administration facility. The driver then drives his lorry to an area of the loading and unloading area which he has been allocated and reverses his lorry into a parking position in the loading and unloading area. The lorry is recognised and identified during the parking procedure by a camera disposed in the loading and unloading area. The camera also makes it possible to deliver information relating to the position of the lorry, such as its distance from a demarcation within the loading and unloading area and its angle of rotation with respect to the ground, to the data processing system of the logistics administration facility. When the parking procedure is completed the exact position of the lorry is then known to the data processing system of the logistics administration facility. These data then serve as a target position for the stacking crane for setting down or picking up a container onto or from the lorry. In the usual manner an operator monitors and controls the loading process on a central monitor via cameras disposed on the load-receiving means. Before the loading and/or unloading process takes place, the driver of the lorry goes to a registration office in order to use the magnetic or chip card to indicate that the lorry is ready to be loaded and unloaded. If the operator of the stacking crane should determine via the cameras that twist locks are incorrectly positioned, he can use an intercom to ask the driver to rectify the incorrect positioning.

SUMMARY OF THE INVENTION

The present invention provides an optimized method for handling loads in a warehouse for standard containers in relation to its through-put rate and safety.

In accordance with one aspect of the invention, a method is provided for handling loads in a warehouse for containers, particularly standard containers, in which the containers are automatically placed into and removed from storage by a container stacking crane, the containers are unloaded by the container stacking crane in a loading and unloading area adjacent to the warehouse onto a truck or lorry parked in a parking space of the loading and unloading area, or are picked up from a lorry parked in a parking space of the loading and unloading area. An increase in the handling rate may be achieved in that after the lorry has entered the parking space and after the driver of the lorry has left the parking space, the parking space is secured against the presence of at least one person, particularly the driver of the lorry, and an authorisation signal for the automatic loading or unloading process is transmitted to the container stacking crane when no person is detected. By means of the securing process, the parking space into which the lorry travels and in which the driver is consequently present, is converted into a secured area which a container stacking crane can also enter and in which it can travel in automatic operation. For purposes of the written description, the phrase “secured against the presence of at least one person” should be understood to mean that intrusion of a person or later entry of persons is prevented or discovered. It will also be appreciated that the terms “lorry” and “lorries” refer to trucks or other vehicles that support and transport the containers on the trucks themselves, or towing vehicles or trucks with trailers that support and transport the containers.

In one embodiment, after the lorry has entered the parking space and after the driver of the lorry has left the parking space, the parking space is secured against access by at least one person, particularly the driver of the lorry. Moreover, provision can be made so that, according to the operational regulations of the handling installation, the presence of persons in the region of the parking space is prohibited and thus the driver is compelled by suitable measures to leave the parking space in order to allow automatic operation. The security measure can be limited to preventing access when no further persons are present (i.e., detected) in the region of the parking space.

Security in relation to the area where the driver is present can be increased in that, after leaving the parking space, the driver of the lorry moves to a waiting area, the presence of the driver is detected or established in the waiting area, and the authorisation signal to the container stacking crane for the loading or unloading process is maintained as long as the driver stays in the waiting area.

In order to achieve high speed in the loading or unloading process, after the loading or unloading process is completed, i.e. after the container stacking crane has left the parking space, the driver is informed of this fact, and the security of the parking space against access by persons, particularly the driver of the lorry, is lifted and the authorisation signal to the container stacking crane for the automatic loading or unloading process is withdrawn.

The parking space may be secured, for example, by closing a gate, which is part of a demarcation surrounding the parking space, against access by persons, particularly the driver of the lorry. It is also possible to replace the gate by suitable sensor groups which provide a sufficiently high level of recognition security.

In order to increase security further, provision may be made for establishing the number of persons in the lorry before it is driven into the parking space, so that only a single person can be directed to travel into the parking space with the lorry.

These and other objects, advantages and features of this invention will become apparent upon review of the following specification in conjunction with the drawings.

DESCRIPTION OF THE PREFERRED EMBODIMENTS

Figure 1:
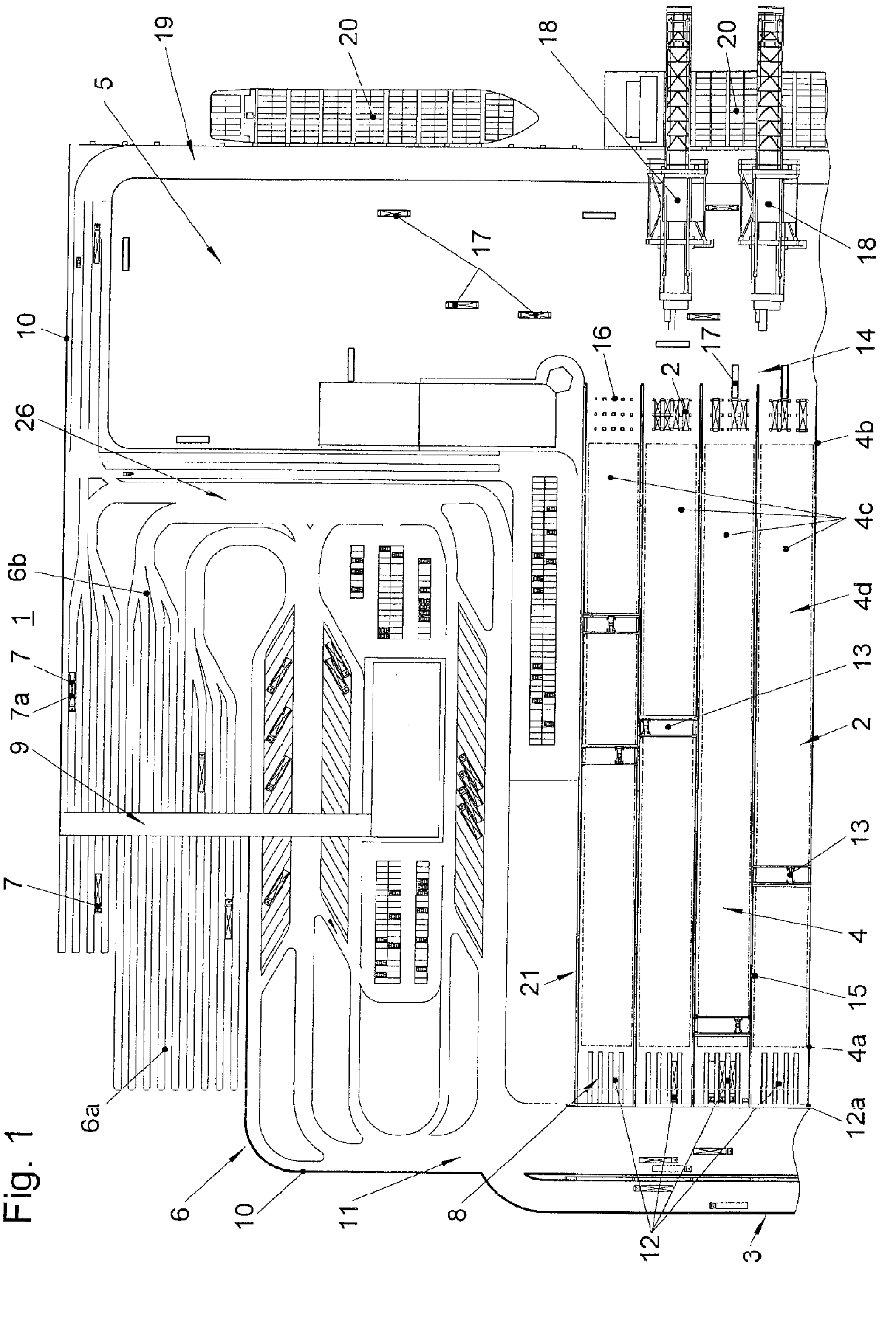
FIG. 1 is a schematic plan view of a handling facility for standard containers in a port area.

FIG. 1 shows a layout plan of a handling installation 1 in a port area in which containers 2, particularly standard containers, are handled. It will be appreciated that the layout plan shows only a section of the handling installation, but the essential components are visible. The handling installation 1 includes a land-side handling area 3, a warehouse 4 and a water-side handling area 5.

The land-side handling area 3 adjoins a land-side end 4*a* of the warehouse 4 and includes an entry and exit area 6 for lorries 7 in order to transport the containers 2 to be handled or transported in and/or out, and adjoining this entry and exit area 6 is a loading and unloading area 8 at the land-side end 4*a* of the warehouse 4. The entry and exit area 6 for the lorries 7 is divided into a public area 6*a*, which is connected to the public road network, and an area 6*b* within the port. The public area 6*a* and the area 6*b* within the port are separated by a control area 9. With the exception of the public area 6*a* of the entry and exit area 6, the handling installation 1 is accordingly surrounded by a boundary 10, for example a fence, wall or a combination thereof. In the control area 9 incoming and outgoing lorries 7 are identified, possibly measured, weighed and processed with respect to their handling task. Cameras (not shown in FIG. 1) may also be mounted in the control area 9 and used to record images of the lorry 7 from all sides, its official number plate and also an identification number provided on the container 2. The data thus generated, which may also be required for the loading and/or unloading of the lorry 7, are transmitted to a superordinate data processing system (not shown) of a logistics administration facility of the handling installation 1. It may also be ensured, in accordance with the safety guidelines of the port operation, that the driver's cabin 7*a* of the lorry 7 contains only a driver and that any passenger leaves the lorry and waits in the control area 9. After passing through the control area 9, an incoming lorry then travels into the internal area 6*b* of the entry and exit area 6 and via appropriate lanes 11 of the entry and exit area to one of the plurality of parking spaces 12 within a loading and unloading area 8 of the warehouse 4.

In the loading and unloading area 8 a lorry 7 parked in the parking space 12 is loaded and/or unloaded by a container stacking crane 13 operating in the warehouse 4. In the illustrated embodiment, container stacking crane 13 operates automatically. The warehouse 4 includes a plurality of warehouse areas 4*c*, which are disposed in parallel and linearly next to each other. Each warehouse area 4*c* has a respective land-side end 4*a* at which the loading and unloading area 8 is allocated, and at a respective water-side end 4*b* is an allocated area 14 where containers are placed into and removed from storage. Each warehouse area 4*c* has one or a plurality of container stacking cranes 13, which can travel along the warehouse areas 4*c* on rails 15. The container stacking cranes 13 transport the containers 2 between the warehouse area 4*c* and the loading and unloading area 8 and/or the area 14 where containers are placed into and removed from storage. In addition to the one or more container stacking cranes 13, each warehouse area 4*c* also has an area 4*d* where the containers 2 are set down. The set-down area 4*d* has a rectangular and elongate base surface on which the containers 2 are disposed in columns and rows. Up to five containers 2 are stacked one on top of another. The set-down containers 2 are aligned with their longitudinal axis or extension substantially in parallel with the rails 15 of the container stacking cranes 13. This alignment of the containers 2 is also found in the loading and unloading area 8 with the incoming and outgoing lorries 7, and in the area 14 where containers are placed into and removed from storage with incoming and outgoing driverless transport vehicles 17, so that the container stacking cranes 13 do not have to pivot the respective containers 2, apart from alignment corrections, if needed, during pick-up and set-down.

At the water-side end 4*b* of the warehouse 4 the containers 2 are set down by the container stacking crane 13 on stationary support frames 16 in the area 14 where containers are placed into and removed from storage, or are picked up therefrom for onward transportation. These support frames 16 serve as interfaces to the driverless transport vehicles 17, which pick up the containers from the support frames 16 and/or set them down thereon and transport them into the area of handling bridges 18 by means of which ships lying alongside a quay 19 in the region of the water-side handling area 5 of the handling installation 1 are loaded and unloaded.

Figure 2:
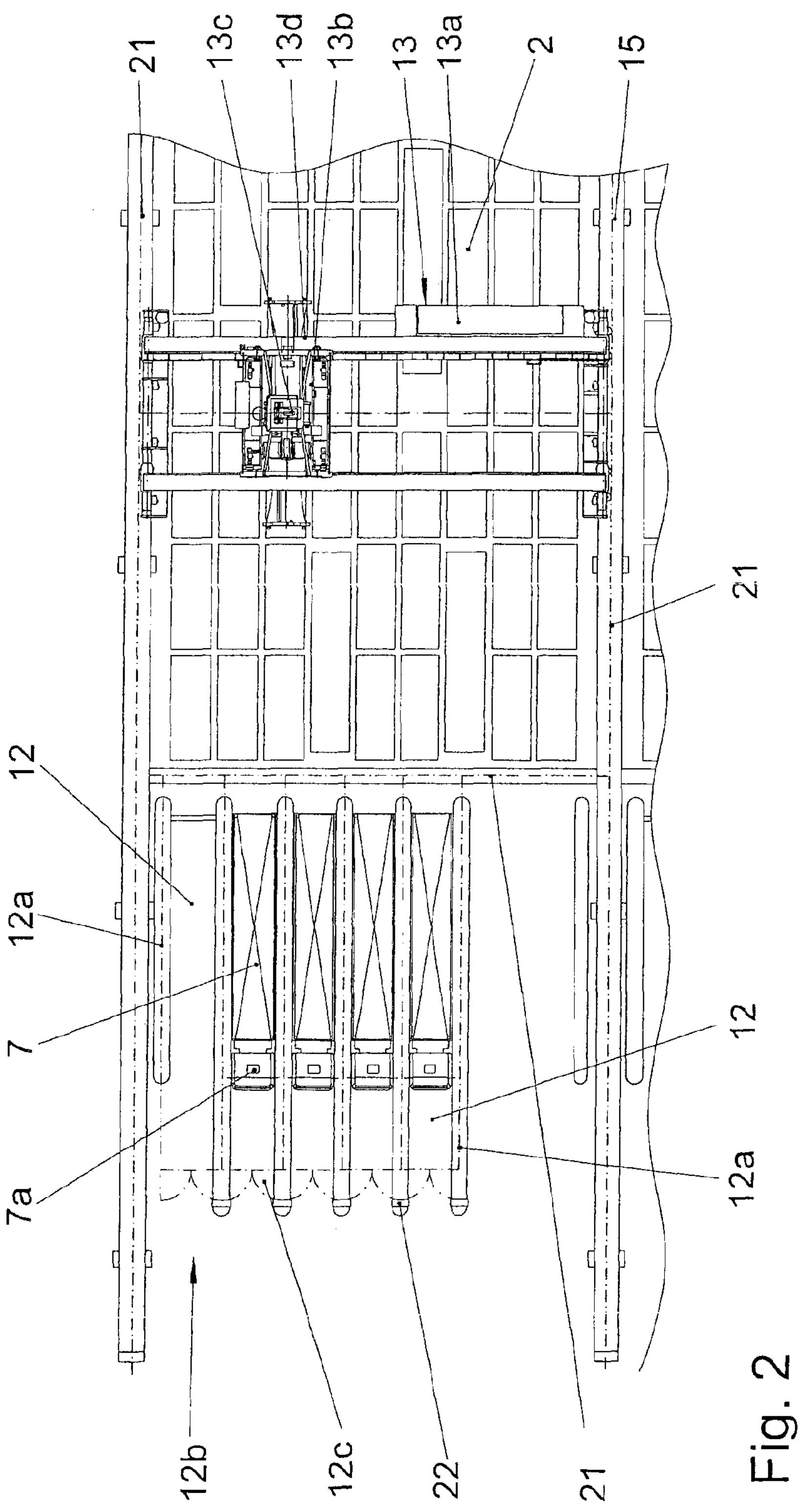
FIG. 2 shows an enlarged portion of FIG. 1 taken from the region of an area of a warehouse where containers are placed into and removed from storage.

FIG. 2 shows an enlarged section of FIG. 1 from the region of the loading and unloading area 8 and of a part of the adjoining warehouse area 4*c*. It is clear that in each loading and unloading area 8 a plurality of parking spaces 12 for lorries 7 are disposed next to each other and, desirably, at the smallest possible or practical distance from each other. In the case of a warehouse area 4*c* with nine rows of containers 2 set down next to each other, six parking spaces for lorries 7 are provided next to each other. Each parking space 12 is closed laterally by its demarcation 12*a* when seen or viewed in the longitudinal direction of a lorry 7. This demarcation 12*a* adjoins a warehouse demarcation 21, which defines the whole warehouse 4 since the container stacking cranes 13 in operation at that point operate automatically and access to this automated area must therefore be prevented. The demarcation 12*a* between the parking spaces can be formed, for example, as a fence, wall, or a combination thereof. In the illustrated embodiment, lateral concrete troughs are shown, which facilitate reverse parking of the lorries 7 since the wheels of the lorry 7 can be guided at this location. A fence is then additionally erected in each case on these concrete troughs. At the end of the parking space 12, facing the container area 4*c*, is provided the warehouse demarcation 21, which surrounds the warehouse 4. The parking space 12 is therefore provided with an opening 12*b* in the manner of a gate at the front. The lorry reverses into the parking space 12 through this opening 12*b* for the subsequent loading and/or unloading process.

In order to prepare the area of a parking space 12, in which a lorry 7 is parked for subsequent loading and/or unloading, for automatic loading and/or unloading by the container stacking crane 13, the method provides that the driver of the lorry 7 leaves (or is compelled to leave) not only the driver's cabin 7*b*, but also the area of the parking space 12 via the opening 12*b* within the demarcation 12*a*. Various possibilities exist to achieve this. In the illustrated embodiment, the opening 12*b* of the demarcation 12*a* is closed by a gate 12*c* after the driver leaves his parked lorry 7. For this purpose, the driver can actuate a switch disposed outside the parking space 12. The switch is located, for example, in the region of a waiting area 22 in the form of a communication stand, which is arranged or disposed as an extension of the lateral demarcation 12*a* of the parking space 12 and outside the demarcation 12*a*. In the region of the waiting area 22, provision is additionally made so that the driver may not leave the waiting area 22 during the process of loading and unloading the lorry 7 by the automatically operating container stacking crane 13. If he did leave the waiting area, this would immediately lead to the cessation of automatic operation in the area of the respectively associated parking space. This can be effected by suitable means such as, for example, a contact mat on the floor, or light barriers, or substantially any suitable recognition electronics. After the gate 12*c* is closed and the driver has entered the waiting area 22, corresponding data are transmitted to the data processing system of the logistics administration facility. The working area of the container stacking crane 13, which is otherwise bounded by the warehouse demarcation 21, is then extended by the now cleared individual parking space 12 so that in relation to this parking space 12 the container stacking crane 13 can now carry out the desired loading or unloading process automatically. After completion of the loading or unloading process by the container stacking crane 13, the driver waiting in the waiting area 22 receives an appropriate notification. The gate 12*c* associated with the respective parking space 12 opens either automatically, or is unlocked so that the driver can open it manually. It is also possible for the driver to operate a switching element, which has been released in the meantime, in order to open the gate 12*c*.

It will be appreciated that it is fundamentally also possible to close off the parking space 12 in the region of its opening by a secure sensor group, rather than by the gate 12*c*.

In addition, in the region of the communication stand 22, provision can be made for a canopy to be positioned in order to provide additional protection for the driver in the event of malfunction of the container stacking crane 13.

It becomes clear from this description that rather than the above-described demarcations 12*a*, which can be closed by the gate 12*c*, individual parking spaces 12 may be defined as automated areas, if desired. When a parking space 12 is defined as an automated area, the gate 12*c* is closed and the driver is outside the parking space 12. The respective parking space 12 becomes a "manual" area, which the container stacking crane 13 is not allowed to enter when the gate 12*c* is opened and the driver is in the region of the lorry 7 or no lorry 7 is parked. In this way, it is achieved that the container stacking crane 13 can carry out the loading or unloading of the lorry 7 automatically.

It is also possible for the loading or unloading process to take place semi-automatically or, in the event of one or more unsuccessful attempts in automatic operation, an operator may intervene via a central control stand using cameras disposed on the container stacking crane 13 and in the region of the parking space 12.

Furthermore, FIG. 2 shows the more detailed construction of the container stacking crane 13. This container stacking crane 13 includes a bridge 13*a*, which can travel along the rails 15 disposed laterally next to the set-down areas 4*d* of the respective warehouse area 4*c*, on which bridge 13*a* a trolley 13*b* can travel transversely to the travel direction of the bridge 13*a*. A vertically moveable mast 13*c* is mounted on the trolley 13*b*, on which mast a load-receiving means 13*d*, such as a spreader frame for receiving the containers 2, is mounted. The container stacking crane 13 is therefore able to travel in the longitudinal direction of the respective warehouse area 4*c*, and its mast 13*c* with the load-receiving means is able to travel transversely to the longitudinal direction of the warehouse area 14*c* via the trolley 13*b*.

It is will be appreciated that it is also possible to use a gantry crane or semi-gantry crane instead of a container stacking crane 13.

Figure 3:
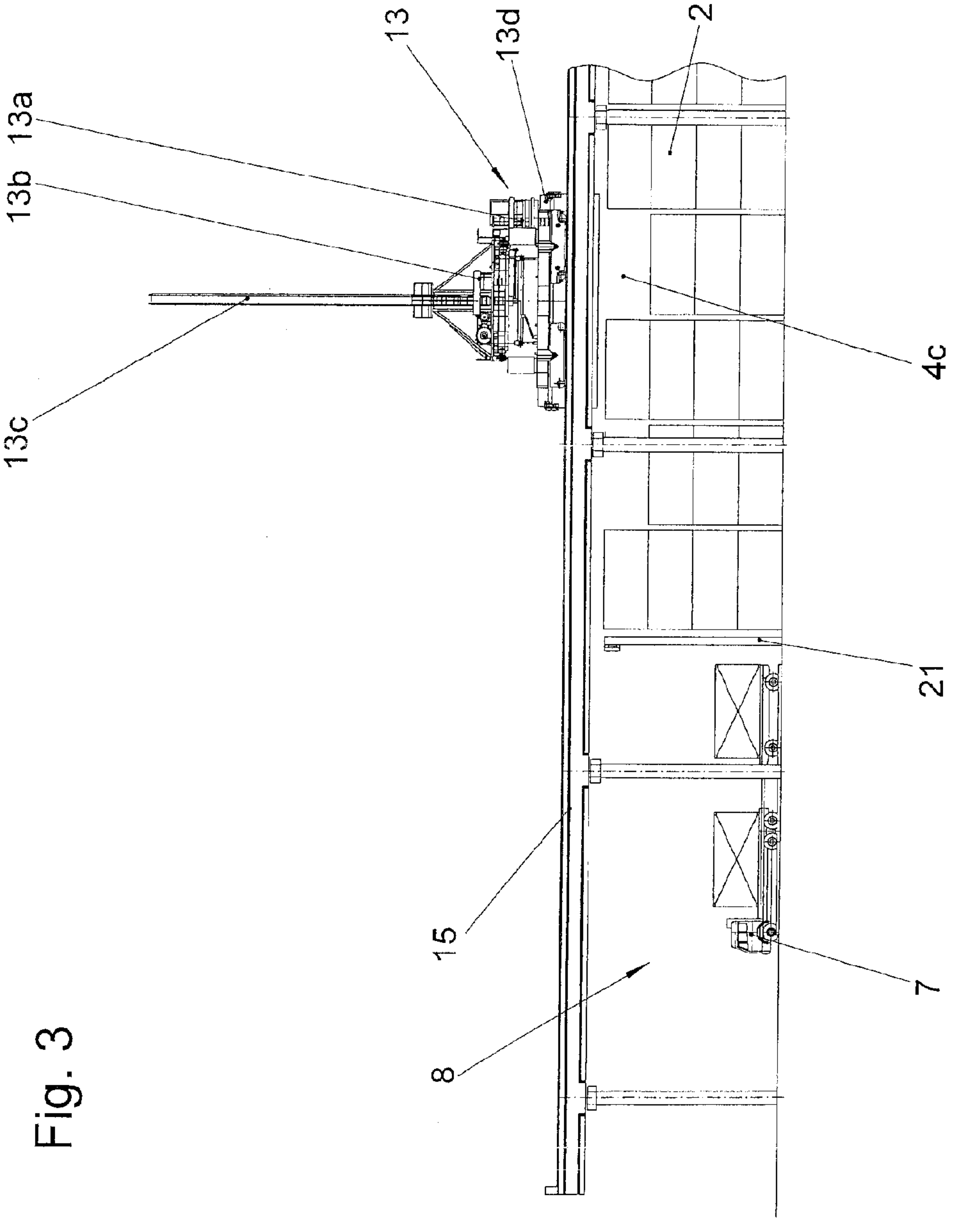
FIG. 3 shows a side view of the portion of FIG. 2.

FIG. 3 shows a side view of FIG. 2, which more clearly shows the construction of the container stacking crane 13 with its vertical mast 13*c*. It also shows that the rails 15 are elevated to a level above the stacked containers 2. The warehouse area 4*c* and the loading and unloading area 8 are separated from each other by the warehouse demarcation 21.

Figure 4:
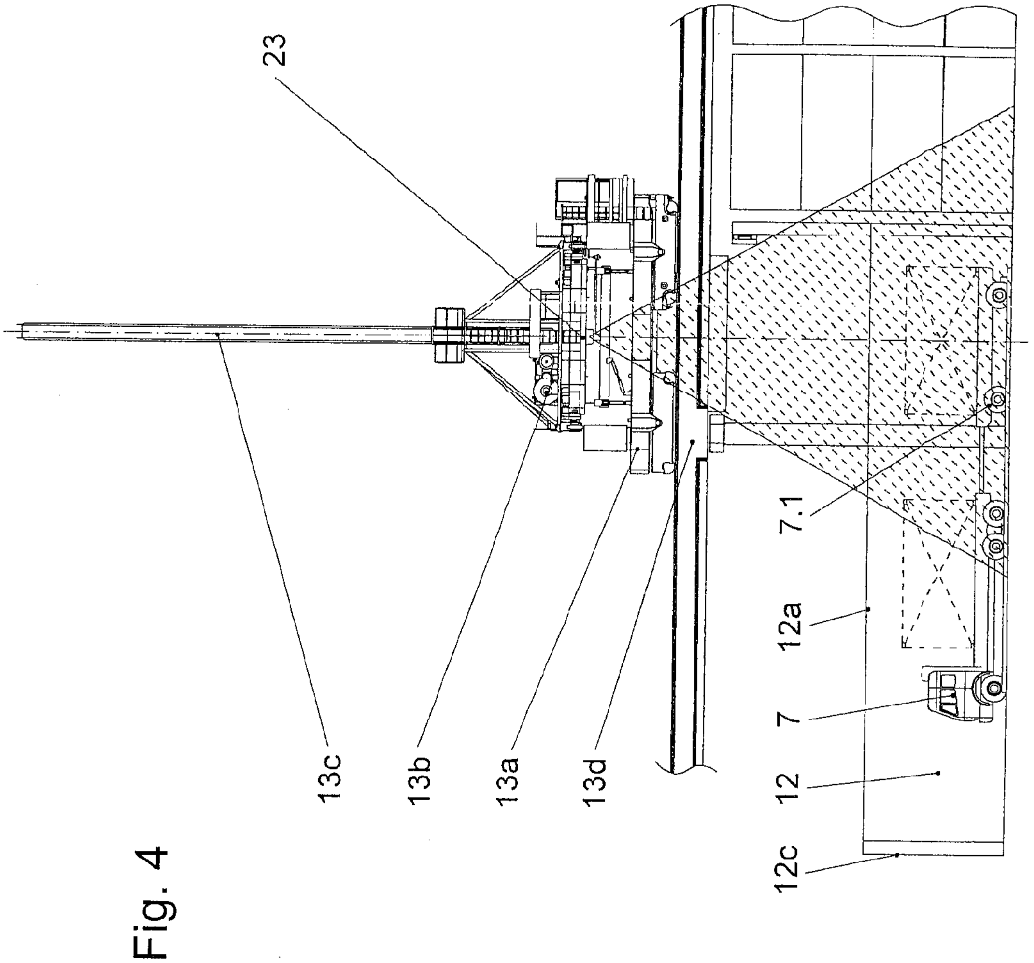
FIG. 4 shows an enlarged section view of FIG. 3 including a representation of the viewing angle of the camera attached to an automatic container crane.

FIG. 4 shows a side view corresponding to FIG. 3, but in this case the container stacking crane 13 has entered the loading and unloading area 8 from the warehouse area 4*c*, and the gate 12*c* has previously been closed after the driver has left the lorry 7 and confirmed his presence in the waiting area 22. A camera 23 is disposed on the container stacking crane 13 in the region of the trolley 13*b*, by means of which camera the positions of the anchoring points on the platforms of the lorries 7 and/or the anchoring points on the containers 2, which are to be unloaded and which are located on a lorry, are recognised and transmitted to the data processing system of the warehouse administration computer. These data are then used for the automatic loading or unloading process.

Changes and modifications to the specifically described embodiments may be carried out without departing from the principles of the present invention, which is intended to be limited only by the scope of the appended claims as interpreted according to the principles of patent law including the doctrine of equivalents.

The invention claimed is:

1. A method for handling loads in a warehouse for containers, said method comprising:

automatically placing the containers into storage and removing the containers from storage with a container stacking crane;

unloading the containers in a loading and unloading area adjacent the warehouse with the container stacking crane;

determining a number of persons, including a driver, positioned in a truck configured for receiving and hauling at least one of the containers when the truck is in a control area;

positioning the truck in a parking space of the loading and unloading area;

vacating the truck and the parking space by the driver;

detecting the departure of the driver from the parking space;

generating an authorization signal and transmitting the signal to the container stacking crane in response to said detecting;

initiating, in response to the authorization signal, an automatic loading or unloading process for transferring the containers onto or off of the truck in the parking space with the container stacking crane;

wherein when said determining the number of persons positioned in the truck in the control area results in a determination that one or more persons, in addition to the driver, are positioned in the truck in the control area; and relocating the one or more additional persons from the truck to a passenger waiting area so that only the driver remains in the truck for said positioning the truck in the parking space.

2. The method as claimed in claim 1, wherein the control area includes the passenger waiting area.

3. The method as claimed in claim 1, further comprising:

relocating the driver from the truck to a driver waiting area after the driver vacates the parking space;

detecting the presence of the driver in the driver waiting area; and maintaining the authorization signal to the container stacking crane for the loading or unloading process as long as the presence of the driver is detected in the driver waiting area.

4. The method as claimed in claim 3, wherein the passenger waiting area and the driver waiting area are in different locations.

5. The method as claimed in claim 1, further comprising securing the parking space against access by persons after the truck has entered the parking space and after the driver of the truck has left the parking space.

6. The method as claimed in claim 5, further comprising:

completing the loading or unloading process;

informing the driver that the loading or unloading process is completed;

unsecuring the parking space to permit access to the parking space by persons; and withdrawing the authorization signal to the container stacking crane for the automatic loading or unloading process.

7. The method as claimed in claim 6, wherein said securing the parking space comprises closing a gate.

8. The method as claimed in claim 7, wherein the gate is part of a demarcation surrounding the parking space.

9. The method as claimed in claim 5, wherein said securing the parking space comprises closing a gate.

10. The method as claimed in claim 9, wherein the gate is part of a demarcation surrounding the parking space.

11. The method as claimed in claim 2, further comprising:

relocating the driver from the truck to a driver waiting area after the driver vacates the parking space;

detecting the presence of the driver in the driver waiting area; and maintaining the authorization signal to the container stacking crane for the loading or unloading process as long as the presence of the driver is detected in the driver waiting area.

12. The method as claimed in claim 11, further comprising:

completing the loading or unloading process;

informing the driver that the loading or unloading process is completed;

unsecuring the parking space to permit access to the parking space by persons; and withdrawing the authorization signal to the container stacking crane for the automatic loading or unloading process.

13. The method as claimed in claim 11, wherein the passenger waiting area and the driver waiting area are in different locations.

14. The method as claimed in claim 11, wherein said securing the parking space comprises closing a gate.

15. The method as claimed in claim 14, wherein the gate is part of a demarcation surrounding the parking space.

16. The method as claimed in claim 15, wherein said securing the parking space comprises closing a gate and said unsecuring the parking space comprises opening the gate.

17. The method as claimed in claim 16, wherein the gate is part of a demarcation surrounding the parking space.

* * * * *

UNITED STATES PATENT AND TRADEMARK OFFICE

CERTIFICATE OF CORRECTION

PATENT NO. : 8,793,013 B2
APPLICATION NO. : 13/132118
DATED : July 29, 2014
INVENTOR(S) : Ronald Kleine It is certified that error appears in the above-identified patent and that said Letters Patent is hereby corrected as shown below:

In the Claims

Column 8
Line 16, Claim 11, “claim 2,” should be --claim 5,--

Signed and Sealed this
Twenty-ninth Day of September, 2015

Michelle K. Lee
*Director of the United States Patent and Trademark Office*